United States Patent
Arima et al.

(10) Patent No.: US 7,392,121 B2
(45) Date of Patent: Jun. 24, 2008

(54) VEHICLE STEERING SYSTEM

(75) Inventors: Masanori Arima, Nara (JP); Naoki Maeda, Kashihara (JP); Kosuke Yamanaka, Kashiwara (JP); Atsushi Ishihara, Yamatokoriyama (JP); Tatsuma Kouchi, Kashiwara (JP); Shingo Maeda, Kashiwara (JP); Daisuke Maeda, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/760,311

(22) Filed: Jun. 8, 2007

(65) Prior Publication Data

US 2007/0288144 A1    Dec. 13, 2007

(30) Foreign Application Priority Data

Jun. 13, 2006   (JP)   .............................. 2006-163747

(51) Int. Cl.
*B26D 6/00*    (2006.01)
*B26D 11/00*   (2006.01)
*B26D 12/00*   (2006.01)

(52) U.S. Cl. .............................. 701/41; 701/70; 701/42; 180/204; 180/411; 180/6.24

(58) Field of Classification Search ................ 701/41, 701/42, 70; 180/204, 411, 6.24
See application file for complete search history.

(56) References Cited

U.S. PATENT DOCUMENTS

| | | | | |
|---|---|---|---|---|
| 4,809,191 A | * | 2/1989 | Domeier et al. ............. | 700/258 |
| 4,998,593 A | * | 3/1991 | Karnopp et al. ............. | 180/408 |
| 5,206,808 A | * | 4/1993 | Inoue et al. .................... | 701/72 |
| 5,228,757 A | * | 7/1993 | Ito et al. ...................... | 303/146 |
| 5,229,944 A | * | 7/1993 | Yasuno ........................ | 701/70 |
| 5,742,141 A | * | 4/1998 | Czekaj ........................ | 318/587 |
| 5,931,252 A | * | 8/1999 | Shimizu et al. ............. | 180/204 |
| 6,018,692 A | * | 1/2000 | Shimizu et al. ............... | 701/41 |
| 6,021,367 A | * | 2/2000 | Pilutti et al. ................. | 701/41 |

(Continued)

FOREIGN PATENT DOCUMENTS

JP       2004-249913        9/2004

OTHER PUBLICATIONS

Chun J et al., Realization of guiding a tractor to implement positions, Jour. of the Japanese Society of Agricultural Machinery, 2004, vol. 66 No. 5, pp. 83-89 (from Dialog(R) File 94, acc. No. 05862097).*

(Continued)

*Primary Examiner*—Cuong H Nguyen
(74) *Attorney, Agent, or Firm*—Oblon, Spivak, McClelland, Maier & Neustadt, P.C.

(57) ABSTRACT

An automatic parking control is cancelled when a motor current has not yet reached a maximum current value $I_{max}$ with a steering angle deviation exceeding a deviation threshold value. In addition, the automatic parking control is cancelled when a steering speed has not yet reached a maximum steering speed with a state where the motor current has reached and remains at the maximum steering speed continuing over a first time period. On the other hand, when a state where the steering speed has reached and remains at the maximum steering speed continues over a second time period, it is determined that there occurs an output shortage of a steering actuator, an automatic parking condition is recalculated, so as to allow the automatic parking continue to continue.

2 Claims, 3 Drawing Sheets

U.S. PATENT DOCUMENTS

| | | | |
|---|---|---|---|
| 6,059,063 A * | 5/2000 | Shimizu et al. | 180/204 |
| 6,070,684 A * | 6/2000 | Shimizu et al. | 180/204 |
| 6,186,259 B1 * | 2/2001 | Shimizu et al. | 180/204 |
| 6,205,382 B1 * | 3/2001 | Suissa | 701/41 |
| 6,212,452 B1 * | 4/2001 | Shimizu et al. | 701/41 |
| 6,216,079 B1 * | 4/2001 | Matsuda | 701/70 |
| 6,344,805 B1 * | 2/2002 | Yasui et al. | 340/932.2 |
| 6,374,167 B2 * | 4/2002 | Iwazaki | 701/41 |
| 6,556,909 B2 * | 4/2003 | Matsumoto et al. | 701/41 |
| 6,708,098 B2 * | 3/2004 | Matsumoto et al. | 701/70 |
| 6,859,713 B2 * | 2/2005 | Pallot | 701/72 |
| 6,879,890 B2 * | 4/2005 | Matsumoto et al. | 701/23 |
| 7,089,101 B2 * | 8/2006 | Fischer et al. | 701/41 |
| 7,165,644 B2 * | 1/2007 | Offerle et al. | 180/244 |
| 7,236,884 B2 * | 6/2007 | Matsumoto et al. | 701/300 |
| 7,318,629 B1 * | 1/2008 | Sun et al. | 303/146 |
| 2007/0051547 A1 * | 3/2007 | Fischer et al. | 180/204 |
| 2007/0288143 A1 * | 12/2007 | Arima et al. | 701/41 |
| 2007/0288144 A1 * | 12/2007 | Arima et al. | 701/41 |

OTHER PUBLICATIONS

U.S. Appl. No. 11/758,902, filed Jun. 6, 2007, Maeda et al.
U.S. Appl. No. 11/760,402, filed Jun. 8, 2007, Maeda et al.
U.S. Appl. No. 11/760,311, filed Jun. 8, 2007, Arima et al.
U.S. Appl. No. 11/760,206, filed Jun. 8, 2007, Arima et al.

* cited by examiner

VEHICLE STEERING SYSTEM

This application is based on and claims a priority from a Japanese Patent Application No. 2006-163747 filed on Jun. 13, 2006, the entire contents of which are incorporated by reference.

BACKGROUND OF THE INVENTION

The present invention relates to a vehicle steering system which can perform an automatic steering control and cancel the control.

There are proposed techniques for performing an automatic steering of a vehicle using a steering actuator provided on the vehicle. For example, a power steering system installed on a vehicle includes an electric motor or a hydraulic actuator as a steering actuator for imparting a steering force (a steering assist force) to a steering mechanism. Then, steered road wheels of the vehicle can be turned by controlling the output of the steering actuator without involving the manipulation of a steering wheel by the driver.

More specifically, in an automatic parking assist control, a target traveling path from a current position to a parking position of the vehicle is calculated, and a relationship of a target turning angle with a traveling distance of the vehicle is obtained so that the vehicle is reversed along the target traveling path so calculated. Then, the steering actuator is controlled based on a steering angle command value which is determined so as to attain a target turning angle according to a traveling distance of the vehicle. At this time, the driver only has to perform the adjustment of stopping position as well as the adjustment of vehicle speed by controlling the brake and accelerator pedals and does not have to manipulate the steering wheel.

When the steered road wheel strikes an obstacle such as a curbstone during the automatic parking control, since the steering actuator cannot steer the steering mechanism, an actual steering angle cannot follow a steering angle command value. In addition to this, in the case of an electric motor being used as the steering actuator, such a state occurs in which a maximum current continues to be supplied to the electric motor, the electric motor being thereby put in an overheat state. Then, in a related art technique disclosed in JP-A-2004-249913, in response to the fact that a steering angle detection value does not reach the steering angle command value and an accumulated time period during which a motor current value is large has reached a predetermined determination time period, it is determined that a steering disablement state occurs and the automatic parking control is cancelled in the midst thereof.

In the case of the automatic parking control mentioned above, the changing speed of the target steering angle of the steering mechanism may become fast depending upon the adjustment of vehicle speed by the driver, the approaching angle to the parking position or the target traveling path. Consequently, although the steering actuator has to drive the steering mechanism at fast speeds, due to output shortage of the steering actuator, the actual steering angle cannot be caused to follow the target steering angle, and this may lead to a state in which a deviation therebetween remains large. In the related art technique mentioned above, even though such a state occurs, the automatic parking control is cancelled.

Thus, the conventional automatic steering function such as automatic parking has a tendency that the control is easily cancelled, and therefore, this function is not necessarily easy for the driver to use.

SUMMARY OF THE INVENTION

Then, an object of the invention is to provide a vehicle steering system which can suppress the cancellation of the automatic steering control and in which the automatic steering function is made easy to handle.

With a view to attaining the object, according to a first aspect of the invention, there is provided a vehicle steering system including a steering actuator (M) for imparting a steering force to a steering mechanism (1) of a vehicle, an automatic steering controller (22) for performing an automatic steering control by controlling the steering actuator based on a target steering angle, a steering angle detection unit (17) for detecting an actual steering angle of the steering mechanism, a steering angle deviation determination device (S1) for determining whether or not a steering angle deviation which is a deviation of an actual steering angle that is detected by the steering angle detection unit relative to the target steering angle exceeds a predetermined threshold value ($\alpha$), a deviation factor determination device (S6-S10) for, when determined by the deviation factor determination device that the steering angle deviation exceeds the predetermined threshold value, determining whether or not a shortage of output of the steering actuator constitutes a factor of the deviation, and an automatic steering cancellation unit (24, S12, S13) for, when determined by the deviation factor determination device that the shortage of output of the steering actuator constitutes a factor of the deviation, causing the automatic steering control by the automatic steering controller to continue, whereas when determined that the shortage of output of the steering actuator does not constitute a factor of the deviation, canceling the automatic steering control by the automatic steering controller.

Note that parenthesized numerals, numerals with a character and characters denote corresponding constituent elements in an embodiment of the invention which will be described later on, and this will be true in the following paragraphs related to this section.

According to the configuration that has been described above, in the condition where the deviation of the actual steering angle relative to the target steering angle exceeds the predetermined threshold value due to the shortage of output of the steering actuator, since the automatic steering control is designed not to be cancelled but to continue, the cancellation of the automatic steering control can be suppressed, whereby the automatic steering function can be made easy to handle.

According to a second aspect of the invention, there is provided a vehicle steering system as set forth in the first aspect of the invention, further including an automatic steering condition changing section (26, 36 S11) for changing a condition for the automatic steering control by the automatic steering controller when the deviation factor determination device determines that the shortage of output of the steering actuator constitutes a factor of the deviation.

According to the configuration that has been described above, in the condition where the deviation of the actual steering angle relative to the target steering angle exceeds the predetermined threshold value due to the shortage of output of the steering actuator, the automatic steering control is caused to continue by changing the condition for the automatic steering control. Consequently, by setting an automatic steering condition in which the actual steering angle can follow the target steering angle, the automatic steering control can be caused to continue in a proper fashion.

The deviation factor determination device determines that the shortage of output of the steering actuator constitutes the factor of the steering angle deviation when the steering actuator is driven at a maximum drive value ($I_{max}$) over a first time period (T1) and a state in which the actual steering speed reaches a maximum steering speed ($\omega_{max}$) that can be attained by the steering actuator continues over a second time period (T2).

In addition, the automatic steering cancellation unit may include a device for determining that abnormality is occurring when the steering actuator is not driven at the maximum drive value with the deviation exceeding the predetermined threshold value, so as to cancel the automatic steering control by the automatic steering controller. Furthermore, the automatic steering cancellation unit may be include a device for determining that abnormality is occurring when the actual steering speed does not reach the maximum steering speed irrespective of the fact that the steering actuator is being driven at the maximum drive value, so as to cancel the automatic steering control by the automatic steering controller.

In a case where the steering actuator is an electric actuator which operates by receiving electric power supplied from a power supply, the vehicle steering system preferably includes further a supply voltage detection device for detecting an output voltage of the power supply and a correction device (S4, S5) for correcting the maximum drive value and or the maximum steering speed according to the output voltage of the power supply.

DETAILED DESCRIPTION OF PREFERRED EMBODIMENTS

Hereinafter, embodiments of the invention will be described in detail with reference to the accompanying drawings.

Figure 1:
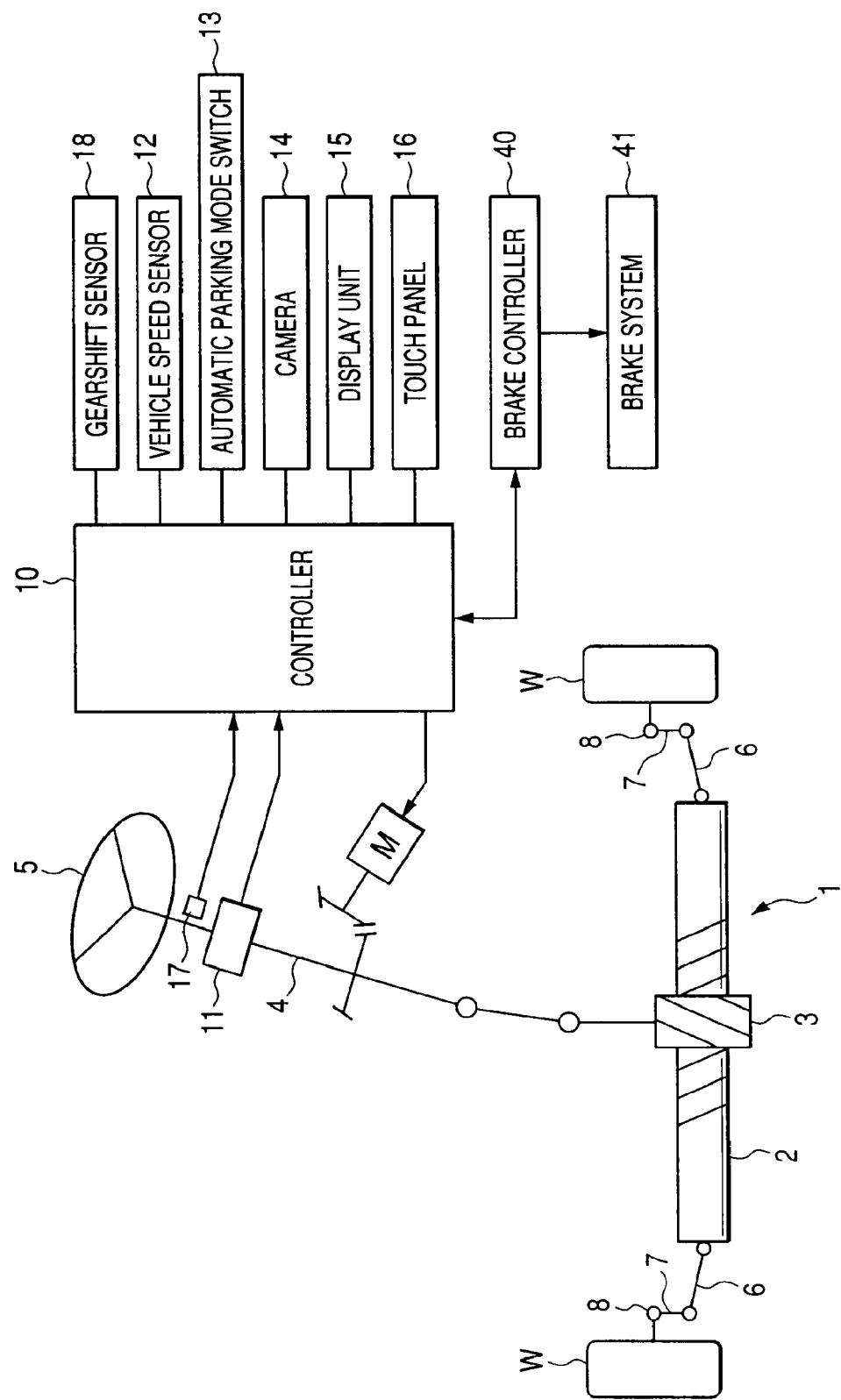
FIG. 1 is a conceptual diagram which describes the configuration of an electric power steering system which constitutes an embodiment of a vehicle steering system of the invention.

FIG. 1 is a conceptual diagram which describes a configuration of an electric power steering system constituting an embodiment of a vehicle steering system of the invention. This electric power steering system is configured such that torque generated by an electric motor M functioning as a steering actuator is transmitted to a steering mechanism 1 for turning steered road wheels W (for example, left and right front road wheels) of a vehicle. The steering mechanism 1 is a rack-and-pinion type steering mechanism which includes a rack shaft 2 which extends along a lateral direction of the vehicle and a pinion 3 which meshes with a gear portion of the rack shaft 2. One end of a steering shaft 4 is connected to the pinion 3, while a steering wheel 5 functioning as a control member is connected to the other end of the steering shaft 4. Consequently, when the steering wheel 5 is manipulated to rotate, the rotation of the steering wheel 5 is transmitted to the rack shaft 2 via the steering shaft 4 and the pinion 3 so as to be transformed into an axial displacement of the rack shaft 2.

Ends of a pair of tie rods 6 are connected to ends of the rack shaft 2, respectively. The other ends of the pair of tie rods 6 are connected to ends of a pair of knuckle arms 7, respectively. The pair of knuckle arms 7 are supported rotatably round a pair of king pins 8, respectively, and are connected to the pair of steered road wheels W via the king pins 8, respectively. In this configuration, when the rack shaft 2 is displaced in an axial direction, the knuckle arms 7 rotate round the king pins 8, respectively, whereby the steered wheels W are turned.

In order to impart a proper steering force to the steering mechanism 1, a controller (an ECU: Electronic Control Unit) 10 is provided for controlling the electric motor M. The controller 10 is designed to receive output signals which are inputted thereinto from a torque sensor 11 for detecting a manipulating torque imparted to the steering wheel 5, a manipulating angle sensor 17 for detecting a manipulating angle of the steering wheel 5 by detecting a rotational angle of the steering shaft 4, a vehicle speed sensor 12 for detecting a vehicle speed of the vehicle on which the electric power steering system is installed, and a road wheel speed sensor 18 for detecting a road wheel speed of a road wheel (which may be the steered road wheel W) of the vehicle. An output of an automatic parking mode switch 13 for setting and canceling an automatic parking mode is further given to the controller 10. A video signal is inputted into the controller 10 from a camera 14 for sensing an image at the rear of the vehicle. Furthermore, a display unit 15 (for example, a liquid crystal display unit or other graphic display unit) which is disposed in the vicinity of a driver's seat of the vehicle is connected to the controller 10. An output signal of a touch panel 16 provided on a display screen of the display unit 15 is designed to be inputted into the controller 10. Furthermore, a brake controller (ECU: Electronic Control Unit) for controlling a brake system 41 of the vehicle is also connected to the controller 10.

When the automatic parking mode is instructed to be performed by manipulation of the automatic parking mode switch 13, the controller 10 controls the electric motor M according to the automatic parking mode in which a steering control (an automatic parking control) is performed for automatic parking of the vehicle. When a cancellation of the automatic parking mode is instructed by manipulation of the automatic parking mode switch 13, the controller 10 cancels the automatic parking control and controls the electric motor M according to an assist mode. The assist mode means a control mode for causing the electric motor M to generate a steering assisting force to assist the driver in manipulating the steering wheel 5 based on a manipulating torque detected by the torque sensor 11 and a vehicle speed detected by the vehicle speed sensor 12.

Figure 2:
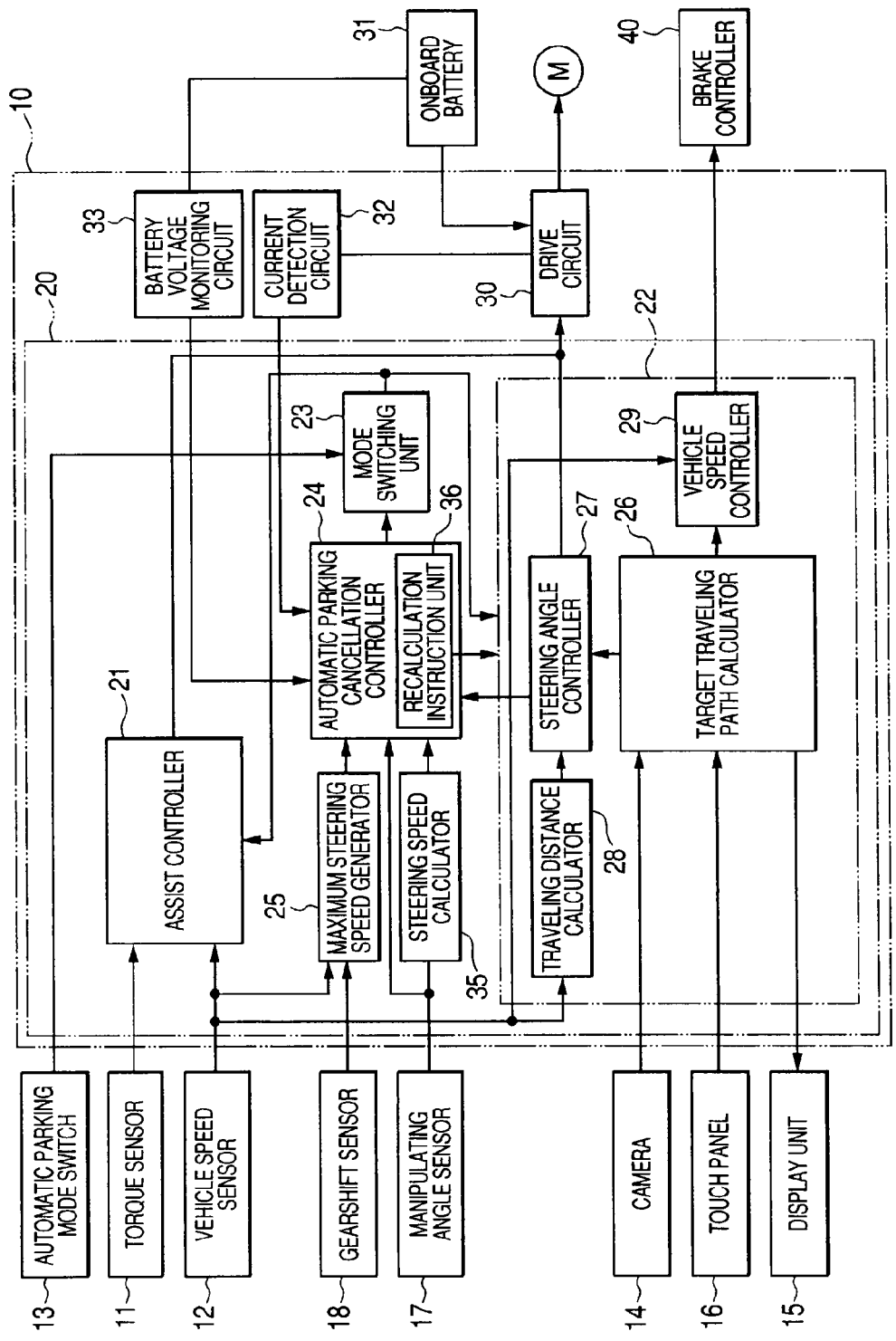
FIG. 2 is a block diagram which describes an electrical configuration of a controller provided in the vehicle steering system.

FIG. 2 is a block diagram which describes an electrical configuration of the controller 10. The controller 10 includes a microcomputer 20, a drive circuit 30 for supplying electric power from an onboard battery 31 to the electric motor M, a current detection circuit 32 for detecting a motor current that is supplied from the drive circuit 30 to the electric motor M, and a battery voltage monitoring circuit 33 for monitoring an output voltage from the onboard battery 31.

The microcomputer 20 includes a CPU (Central Processing Unit) and a memory (ROM, RAM and the like) and performs functions of a plurality of functional processing units. The functional processing units include an assist controller 21 for controlling the electric motor M according to the assist mode, an automatic parking controller 22 for controlling the electric motor M according to the automatic parking mode, a mode switching unit 23 for switching the mode of the electric power steering system between the automatic parking mode and the assist mode, an automatic parking cancellation controller 24 for canceling the automatic parking control by the automatic parking controller 22 so as to shift the mode of the electric power steering system from the automatic parking mode to the assist mode when a predetermined condition is established, a maximum steering speed generator 25 for calculating a maximum steering speed $\omega_{max}$ which can be attained by the electric motor M, and a steering speed calculator 35 for calculating an actual steering speed ω which is a changing speed of the steering angle of the steering mechanism.

The mode switching unit 23 selects a control by either of the assist controller 21 and the automatic parking controller 22 and makes the control so selected effective, whereby the automatic parking mode and the assist mode are switched therebetween. This mode switching unit 23 not only switches the control mode according to the setting by the automatic parking mode switch 13 but also switches the control mode from the automatic parking mode to the assist mode according to an instruction from the automatic parking cancellation controller 24 while the automatic parking mode is in effect.

The maximum steering speed generator 25 includes, for example, a road surface friction coefficient calculator for calculating a road surface friction coefficient on the surface of a road on which the vehicle is being driven based on a relationship between the vehicle speed detected by the vehicle speed sensor 12 and the road wheel speed (a rotational speed of the road wheel) detected by the road wheel speed sensor 18, and a maximum steering speed table for generating a maximum steering speed $\omega_{max}$ which corresponds to the road surface friction coefficient and the vehicle speed (or the road wheel speed). Namely, since a relationship between vehicle speed and road wheel speed depends upon road surface friction coefficient, a road surface friction coefficient can reversely be calculated based on the relationship. In addition, the maximum steering speed $\omega_{max}$ that can be attained by driving the steering mechanism 1 by the electric motor M at its maximum output depends upon the road surface friction coefficient and the vehicle speed (or the road wheel speed). Namely, the maximum steering speed $\omega_{max}$ is a function of the road wheel surface friction coefficient and the vehicle speed (or the road wheel speed). A table which represents this function is the maximum steering speed table. Consequently, a maximum steering speed $\omega_{max}$ which corresponds to a driving state of the vehicle is generated by obtaining a road surface friction coefficient by the road surface friction coefficient calculator and reading out a maximum steering speed $\omega_{max}$ which corresponds to the road surface friction coefficient so obtained and a vehicle speed obtained by the vehicle speed sensor 12 (or a road wheel speed that is detected by the road wheel speed sensor 18) from the maximum steering speed table.

Since the manipulating angle sensor 17 detects a manipulating angle of the steering wheel 5 which is mechanically connected to the steering mechanism 1, the manipulating angle sensor 17 also detects an actual steering angle (an actual turning angle) of the steering mechanism 1 at the same time as the detection of the manipulating angle of the steering wheel 5. Then, the steering speed calculator 35 obtains an actual steering speed ω by time differentiating a manipulating angle detected by the manipulating angle sensor 17.

The automatic parking cancellation controller 24 determines whether or not the automatic parking mode is to be cancelled based on the maximum steering speed $\omega_{max}$ generated by the maximum steering speed generator 25, the battery voltage detected by the battery voltage monitoring circuit 33, the motor current detected by the current detection circuit 32, the actual steering speed ω obtained by the steering speed calculator 35, the actual steering angle detected by the manipulating angle sensor 17, and the target steering angle set by the automatic parking controller 22, and give to the mode switching unit 23 an automatic parking cancellation instruction which represents a cancellation of the automatic parking mode when the cancellation is determined to be made.

The automatic parking cancellation controller 24 also has a recalculation instruction unit 36 for instructing a recalculation of the automatic parking condition by the automatic parking controller 22 when the automatic parking mode is in effect. This recalculation instruction unit 36 gives to the automatic parking controller 22 an instruction to recalculate the automatic parking condition when the deviation of the actual steering angle (the manipulating angle) relative to the target steering angle exceeds a predetermined deviation threshold value α and when output shortage of the electric motor M constitutes a cause for the excess of the deviation. The automatic parking condition in this case includes a target traveling path to the target parking position, a vehicle speed limit value (an upper limit value) during the automatic parking control and the like.

The assist controller 21 determines a motor target current value which corresponds to a manipulating torque that is detected by the torque sensor 11 and a vehicle speed that is detected by the vehicle speed sensor 12. More specifically, the assist controller 21 sets a motor target current value according to an assist characteristic which determines a motor target current value which corresponds to the manipulating torque and the vehicle speed and controls the electric motor M via the drive circuit 30 so that the motor target current value is attained. The assist characteristic is stored in advance in the memory within the microcomputer 20 in the form of a map (a table), for example. This assist characteristic is determined such that for example, the motor target current value is set larger as the absolute value of the manipulating torque becomes larger and the motor target current value is set smaller as the vehicle speed becomes faster.

The automatic parking controller 22 includes a target traveling path calculator 26 for calculating a target traveling path from a current position to a target parking position of the vehicle, a steering angle controller 27 for controlling a steering angle according to the target traveling path calculated by the target traveling path calculator 26, a traveling distance calculator 28 for calculating a traveling distance based on an output signal of the vehicle speed sensor 12, and a vehicle speed controller 29 for limiting the vehicle speed while the automatic parking control is in operation.

The target traveling path calculator 26 calculates a target traveling path based on a video image sensed by the camera 14 and an input from the touch panel 16. More specifically, when the driver manipulates the automatic parking mode switch 13 to designate the automatic parking mode, a video image outputted by the camera 14 is displayed on the display unit 15. Then, the driver designates a desired parking position from the touch panel 16 by referring to the video image displayed on the display unit 15. Consequently, as this occurs, the touch panel 16 functions as a parking position designation device. When the parking position is designated in this way, the target traveling path calculator 26 calculates a positional relationship between the current position of the subject vehicle and the designated parking position and furthermore obtains a path which avoids an obstacle that is recognized from the video image sensed by the camera1 14 as a target traveling path. The traveling path so calculated may be displayed on the display unit 15.

The target traveling path calculator 26 stores information on the target traveling path in the memory in the form of steering control table data which is table data which represents a relationship between a traveling distance over which the vehicle travels from the current position to the target parking position thereof and a steering angle which corresponds to the traveling distance. The steering angle controller 27 controls the electric motor M by referring to the steering control table data. Namely, the steering angle controller 27 obtains a target steering angle corresponding to a traveling distance of the vehicle which is inputted from the traveling distance calculator 28 from the steering control table data based on the traveling distance. The steering angle controller 27 controls the electric motor M via the drive circuit 30 so that the target steering angle so obtained is attained.

The vehicle speed controller 29 determines a vehicle speed upper limit value and monitors an output of the vehicle speed sensor 12 so as to issue a brake application request to a brake controller 40 when the vehicle speed reaches the vehicle speed upper limit value. In response to this, the brake controller 40 controls the brake system 41 (refer to FIG. 1) so as to suppress the vehicle speed in such a manner as to stay below the vehicle speed upper limit value.

During the automatic parking, basically, the driver does not manipulate the steering wheel but manipulates the accelerator pedal and the brake pedal so as to adjust the speed of the vehicle, as well as to adjust a stopping position. While this is being performed, the steering angle of the steering mechanism 1 is automatically adjusted every moment by the electric motor M controlled by the automatic parking controller 22. When the vehicle speed reaches the vehicle speed upper limit value, the brake controller 40 disturbs the adjustment of vehicle speed by the driver, so as to perform a speed reduction control.

Figure 3:
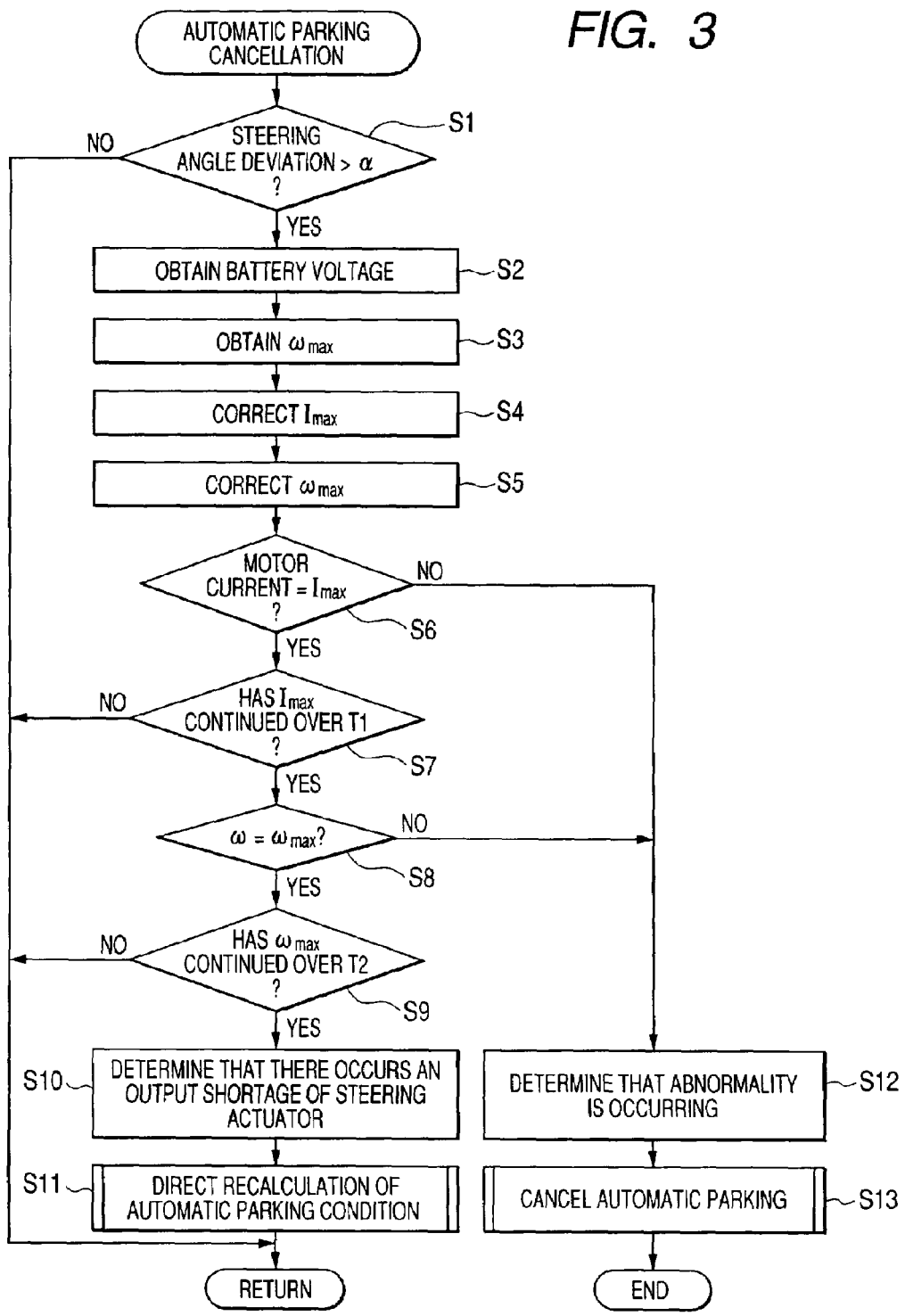
FIG. 3 is a flowchart which describes the operation of an automatic parking cancellation controller provided in the controller.

FIG. 3 is a flowchart which describes an operation which is performed repeatedly on a predetermined control cycle by the automatic parking cancellation controller 24 during the automatic parking mode. The automatic parking cancellation controller 24 obtains a target steering angle from the steering angle controller 27 and also obtains an actual steering angle from the manipulating angle sensor 17, so as to obtain a steering angle deviation which is a deviation between the target steering angle and the actual steering angle. If the steering angle deviation is equal to or less than the deviation threshold value $\alpha$ (step S1: NO), it is judged that the actual steering angle is following the target steering angle, and thus the automatic parking cancellation controller 24 does not execute processes in steps onward in the flowchart shown in FIG. 3 and the flow returns, whereby the automatic paring mode is held.

On the contrary, if the steering angle deviation exceeds the deviation threshold value $\alpha$ (step S2: YES) to judge that the actual steering angle is not following the target steering angle, the automatic parking cancellation controller 24 obtains a battery voltage from the battery voltage monitoring circuit 33 (step S2) and obtains a maximum steering speed $\omega_{max}$ from the maximum steering speed generator 25 (step S3). Furthermore, the automatic parking cancellation controller 24 corrects the maximum current value $I_{max}$ of the electric motor M (step S4) according to the battery voltage so obtained and then corrects the maximum steering speed $\omega_{max}$ (step S5).

The maximum current value $I_{max}$ is a maximum value of motor current that is permitted to be supplied to the electric motor M, which is a value set in advance according to the specification of the electric motor M with a view to avoiding the failure of the electric motor M due to overheat. For example, in a case where the electric motor M is designed to be supplied with a maximum current of 50 A, 40 A may preferably be set as the maximum current value $I_{max}$ in advance. When the battery voltage is low, however, since a larger maximum current value is permitted, the maximum current value $I_{max}$ that has already been set is made to be corrected for use according to the battery voltage (step S4). In addition, when the battery voltage decreases, a maximum steering speed that can be realized by the electric motor M also decreases. Then, the maximum steering speed $\omega_{max}$ is designed to be corrected according to the battery voltage (step S5).

Next, the automatic parking cancellation controller 24 judges whether or not a motor current (a drive value) detected by the current detection circuit 32 is equal to the corrected maximum current value $I_{max}$ (a maximum drive value) (step S6). If the judgment is negative (step S6: NO), this means that the electric motor M is not being driven with its maximum output, although the steering angle deviation exceeds the deviation threshold value $\alpha$. Then, in this case, it is determined that abnormality occurs (step S12), and the automatic parking cancellation controller 24 gives to the mode switching unit 23 an automatic parking cancellation instruction to cancel the automatic parking control (step S13). In response to this, the mode switching unit 23 switches the control mode from the automatic parking mode to the assist mode.

On the contrary, in step S6, if the motor current is judged to be equal to the corrected maximum current value $I_{max}$ (step S6: YES), the automatic parking cancellation controller 24 further judges whether or not a time period during which the motor current is held at the corrected max current value $I_{max}$ has reached a predetermined first time period T1 (for example, 2 seconds) (step S7). If the relevant time period has not yet reached the first time period (step S7: NO), the automatic parking cancellation controller 24 does not execute processes in steps onward in the flowchart shown in FIG. 3 and the flow returns, whereby the automatic parking control is held.

If it is judged in step S7 that the time period during which the motor current is held at the corrected maximum current value $I_{max}$ has continued over the first time period T1 (step S7: YES), the automatic parking cancellation controller 24 further judges whether or not the actual steering speed $\omega$ obtained by the steering speed calculator 35 has reached the corrected maximum steering speed $\omega_{max}$ (step S8). If the actual steering speed $\omega$ has not reached the corrected maximum steering speed $\omega_{max}$ (step S8: NO), since this is a case where the maximum steering speed $\omega_{max}$ has not been able to be attained, although the electric motor M is driven at the maximum current value $I_{max}$ over the first time period T1, it is determined that abnormality occurs (step S12), and the automatic parking cancellation controller 24 gives to the mode switching unit 23 an automatic parking cancellation instruction to cancel the automatic parking control (step S13). In response to this, the mode switching unit 23 switches the control mode from the automatic parking mode to the assist mode.

If it is judged in step S8 that the actual steering speed $\omega$ has reached the maximum steering speed $\omega_{max}$ (step S8: YES), the automatic parking cancellation controller 24 further judges whether or not the state where the actual steering speed $\omega$ has reached and remains at the maximum steering speed $\omega_{max}$ is held over a predetermined second time period T2 (for example, 1 second) (step S9). If a time period during which the relevant state is so held has not yet reached the second time period T2 (step S9: NO), the automatic parking cancellation controller 24 does not execute processes in steps onward in the flowchart shown in FIG. 3 and the flow returns, whereby the automatic parking control is held.

On the contrary, if it is judged in step S9 that the state where the actual steering speed $\omega$ has reached and remains at the maximum steering speed $\omega_{max}$ is held over the second time period T2 (step S9: YES), the automatic parking cancellation controller 24 determines that this is the state where the steering angle deviation exceeds the deviation threshold value α due to output shortage of the electric motor M, which is the steering actuator (step S10). Receiving this determination, the recalculation instruction unit 36 issues to the automatic parking controller 22 an instruction to execute a recalculation of the automatic parking control condition (step S11). In this case, the automatic parking mode is held.

Receiving the recalculation instruction from the recalculation instruction unit 36, the automatic parking controller 22 recalculates the automatic parking control condition such that the vehicle can be led to the designated parking position with a slower steering speed. For example, the target traveling path calculator may recalculate a target traveling path having a larger radius of curvature than the existing target traveling path. In addition, an instruction to modify the vehicle speed upper limit value to a lower level than the existing value may be given from the target traveling path calculator 26 to the vehicle speed controller 29. Since the steering speed while the automatic parking is in effect can be made slow by modifying the conditions of the automatic parking control in this way, the actual steering angle of the steering mechanism 1 which is driven by the electric motor M can be made to follow the target steering angle.

Thus, according to the embodiment, in the state where the steering angle deviation exceeds the predetermined threshold value due to the output shortage of the electric motor M which functions as the steering actuator, the output shortage of the electric motor M is compensated for by recalculating the automatic parking control condition, so as to allow the automatic parking control to continue, whereby since the cancellation of the automatic parking control due to the output shortage of the electric motor M can be suppressed, the ease with which the automatic paring function is handled can be increased.

Thus, while the embodiment of the invention has been described heretofore, the invention can be implemented in other forms. For example, while in the embodiment that has been described above, the manipulating angle sensor 17 for detecting the manipulating angle of the steering wheel 5 as the control member is used for detecting the actual steering angle of the steering mechanism 1, the actual steering angle can be detected by the use of an output from a rack traveling amount sensor for detecting a traveling amount of the rack shaft 2, or the actual steering angle can be detected by detecting a rotational angle of the electric motor M.

Furthermore, while in the embodiment that has been described above, the invention is described as being applied to the electric power steering system, the invention can be widely applied to vehicle steering systems in which a steering actuator is provided for imparting a steering force to a steering mechanism of a vehicle. These vehicle steering systems include a so-called steer-by-wire system, a hydraulic power steering system and the like. The steer-by-wire system means a system in which a mechanical connection between a control member such as a steering wheel or the like and steering mechanism is eliminated, so that a manipulating amount of the control member is detected by a sensor and a driving force of a steering actuator which is controlled according to an output from the sensor is transmitted to the steering mechanism.

In addition, while in the embodiments, the automatic parking control is raised as the example of the automatic steering control, the invention can also be applied to other types of automatic steering controls such as an automatic steering control for causing a vehicle to be driven automatically along a driving lane.

The embodiments described above are to be regard as illustrative rather than restrictive. Variations and changes may be made by others, and equivalents employed, without departing from spirit of the present invention. Accordingly, it is intended that all variations, changes and equivalents which fall within the spirit and scope of the present invention as defined in the claims be embraced thereby.

What is claimed is:

1. A vehicle steering system comprising:
   a steering actuator that imparts a steering force to a steering mechanism of a vehicle;
   an automatic steering controller that performs an automatic steering control by controlling the steering actuator based on a target steering angle;
   a steering angle detector that detects an actual steering angle of the steering mechanism;
   a steering angle deviation determination unit that determines whether or not a steering angle deviation which is a deviation of an actual steering angle detected by the steering angle detector relative to the target steering angle exceeds a predetermined threshold value;
   a deviation factor determination unit that determines whether or not an output shortage of the steering actuator constitutes a factor of the deviation when the steering angle deviation determination unit determines that the steering angle deviation exceeds the predetermined threshold value; and
   an automatic steering cancellation unit that causes the automatic steering control by the automatic steering controller to continue when the deviation factor determination unit determines that the output shortage of the steering actuator constitutes the factor of the deviation, and cancels the automatic steering control by the automatic steering controller when the deviation factor determination unit determines that the output shortage of the steering actuator does not constitute the factor of the deviation.

2. The vehicle steering system according to claim 1 further comprising an automatic steering condition changing unit that changes a condition for the automatic steering control by the automatic steering controller when the deviation factor determination unit determines that the output shortage of the steering actuator constitutes the factor of the deviation.

* * * * *